United States Patent
Dong et al.

(10) Patent No.: US 9,531,841 B2
(45) Date of Patent: Dec. 27, 2016

(54) COMMUNICATIONS METHOD, CLIENT, AND TERMINAL

(71) Applicant: Huawei Technologies Co., Ltd., Shenzhen (CN)

(72) Inventors: Tiantian Dong, Shenzhen (CN); Zijun Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 211 days.

(21) Appl. No.: 14/585,944

(22) Filed: Dec. 30, 2014

(65) Prior Publication Data
US 2015/0120824 A1    Apr. 30, 2015

Related U.S. Application Data

(63) Continuation of application No. PCT/CN2013/082043, filed on Aug. 22, 2013.

(51) Int. Cl.
*H04L 29/06* (2006.01)
*H04L 12/58* (2006.01)

(52) U.S. Cl.
CPC ............ *H04L 67/42* (2013.01); *H04L 12/58* (2013.01); *H04L 51/18* (2013.01); *H04L 51/08* (2013.01)

(58) Field of Classification Search
USPC .................. 709/203, 220, 223, 227, 237
See application file for complete search history.

(56) References Cited

U.S. PATENT DOCUMENTS

| 5,880,731 A | 3/1999 | Liles et al. |
| 8,700,744 B2* | 4/2014 | Anderson ............. H04L 1/0061 |
| | | 709/220 |
| 8,711,136 B2* | 4/2014 | Park ..................... G09G 3/3233 |
| | | 345/204 |
| 2008/0182566 A1 | 7/2008 | Camp, Jr. |

(Continued)

FOREIGN PATENT DOCUMENTS

| CN | 1859117 A | 11/2006 |
| CN | 101364957 A | 2/2009 |

(Continued)

OTHER PUBLICATIONS

Foreign Communication From a Counterpart Application, European Application No. 13887593.5, European Office Action dated Mar. 8, 2016, 5 pages.

(Continued)

*Primary Examiner* — Jude Jean Gilles
(74) *Attorney, Agent, or Firm* — Conley Rose, P.C.

(57) ABSTRACT

A communications method, a client, and a terminal. The method includes receiving, by a first client, information from a second client; obtaining, by the first client, first driving data from the information, where the first driving data is used for controlling an action of a virtual image of a user of the second client, and the virtual image of the user of the second client is presented on a terminal in which the first client is located; and controlling, by the first client, the action of the virtual image of the user of the second client according to the first driving data. In the embodiments of the present invention, a receiving end obtains driving data from information sent by a sending end, and controls an action of a virtual image of a user of the sending end using the driving data.

27 Claims, 7 Drawing Sheets

(56) References Cited

U.S. PATENT DOCUMENTS

| | | |
|---|---|---|
| 2010/0045697 A1 | 2/2010 | Reville et al. |
| 2010/0278393 A1* | 11/2010 | Snook ............... G06F 3/011 |
| | | 382/107 |
| 2011/0119388 A1 | 5/2011 | Attanasio et al. |
| 2011/0184839 A1 | 7/2011 | Chen et al. |
| 2012/0079046 A1 | 3/2012 | Murphy |
| 2012/0113092 A1* | 5/2012 | Bar-Zeev ............ G02B 27/017 |
| | | 345/419 |
| 2013/0002683 A1 | 1/2013 | Li et al. |
| 2013/0007668 A1* | 1/2013 | Liu ..................... G06F 3/012 |
| | | 715/841 |
| 2014/0372944 A1* | 12/2014 | Mulcahy ........... G06F 3/04815 |
| | | 715/810 |

FOREIGN PATENT DOCUMENTS

| | | |
|---|---|---|
| CN | 101931621 A | 12/2010 |
| CN | 102571633 A | 7/2012 |
| EP | 2028611 A1 | 2/2009 |
| EP | 2793432 A1 | 10/2014 |
| WO | 2004079530 A2 | 9/2004 |

OTHER PUBLICATIONS

Foreign Communication From a Counterpart Application, European Application No. 13887593.5, Extended European Search Report dated May 22, 2015, 7 pages.

Partial English Translation and Abstract of Chinese Patent Application No. CN101931621A, Mar. 3, 2015, 5 pages.

Foreign Communication From a Counterpart Application, PCT Application No. PCT/CN2013/082043, English Translation of International Search Report dated May 23, 2014, 2 pages.

Foreign Communication From a Counterpart Application, PCT Application No. PCT/CN2013/082043, Written Opinion dated May 23, 2014, 6 pages.

* cited by examiner

COMMUNICATIONS METHOD, CLIENT, AND TERMINAL

CROSS-REFERENCE TO RELATED APPLICATIONS

This application is a continuation of International Application No. PCT/CN2013/082043, filed on Aug. 22, 2013, which is hereby incorporated by reference in its entirety.

TECHNICAL FIELD

Embodiments of the present invention relate to the field of communications, and in particular, to a communications method, a client, and a terminal.

BACKGROUND

With the development of technologies, the performance of intelligent terminals is improved significantly, for example, screen sizes are enlarged, computer processing unit (CPU) clock speeds are increased, and network speeds are improved. In addition, intelligent terminals at present are compatible with various sensors and support three-dimensional (3D) display technologies.

Basically, all intelligent terminals at present support short messages and an instant messaging function based on data networks. However, all these communication manners use planar-message interaction manner and the messages are displayed in forms of bubbles in different colors, which results in a dull effect and poor user experience.

SUMMARY

Embodiments of the present invention provide a communications method, a client, and a terminal, to improve user experience of two communication parties.

According to a first aspect, a communications method is provided, including receiving, by a first client, information from a second client; obtaining, by the first client, first driving data from the information, where the first driving data is used for controlling an action of a virtual image of a user of the second client, and the virtual image of the user of the second client is presented on a terminal in which the first client is located; and controlling, by the first client, the action of the virtual image of the user of the second client according to the first driving data.

With reference to the first aspect, in an implementation manner of the first aspect, the information is information input to the second client by the user of the second client; and the obtaining, by the first client, first driving data from the information includes extracting, by the first client, the first driving data from the information.

With reference to any one of the first aspect and the foregoing implementation manner of the first aspect, in another implementation manner of the first aspect, the information includes the first driving data.

With reference to the first aspect or any one of the foregoing implementation manners of the first aspect, in another implementation manner of the first aspect, the controlling, by the first client, the action of the virtual image of the user of the second client according to the first driving data includes sending, by the first client, the first driving data to a third-party application, so that the third-party application controls the action of the virtual image of the user of the second client according to the first driving data, where the third-party application is used for controlling the virtual image of the user of the second client, and the terminal in which the first client is located includes the third-party application.

With reference to the first aspect or any one of the foregoing implementation manners of the first aspect, in another implementation manner of the first aspect, the controlling, by the first client, the action of the virtual image of the user of the second client according to the first driving data includes invoking, by the first client, a driving function interface corresponding to the virtual image of the user of the second client; and controlling, by the first client, the action of the virtual image of the user of the second client according to the first driving data and a driving algorithm in the driving function interface.

With reference to the first aspect or any one of the foregoing implementation manners of the first aspect, in another implementation manner of the first aspect, before the controlling, by the first client, the action of the virtual image of the user of the second client according to the first driving data, the method further includes receiving, by the first client, a user identifier of the second client from the second client or a server; and determining, by the first client, the virtual image of the user of the second client according to the user identifier of the second client.

With reference to the first aspect or any one of the foregoing implementation manners of the first aspect, in another implementation manner of the first aspect, the determining, by the first client, the virtual image of the user of the second client according to the user identifier of the second client includes sending, by the first client to the server, a request used for downloading the virtual image of the user of the second client, where the request carries the user identifier of the second client, and a correspondence between the user identifier of the second client and the virtual image of the user of the second client is stored in the server; and receiving, by the first client, the virtual image of the user of the second client from the server.

With reference to the first aspect or any one of the foregoing implementation manners of the first aspect, in another implementation manner of the first aspect, the user of the second client has a plurality of available virtual images, and before the determining, by the first client, the virtual image of the user of the second client according to the user identifier of the second client, the method further includes receiving, by the first client, an indication parameter from the second client or the server, where the indication parameter is used for indicating one of the plurality of available virtual images of the user of the second client; and the determining, by the first client, the virtual image of the user of the second client according to the user identifier of the second client includes determining, by the first client, the plurality of available virtual images of the user of the second client according to the user identifier of the second client; and determining the virtual image, indicated by the indication parameter, of the user of the second client.

With reference to the first aspect or any one of the foregoing implementation manners of the first aspect, in another implementation manner of the first aspect, the method further includes sending, by the first client, a query message to the server, so that the server determines, according to a query condition in the query message, candidate virtual images which satisfy the query condition and are among virtual images stored in the server; receiving, by the first client, a query result returned by the server, where the query result includes description information of the candidate virtual images; and selecting, by the first client, at least one virtual image as a virtual image of a user of the first client from the candidate virtual images according to the description information of the candidate images, and sending the selection result to the server, so that the server stores a mapping relationship between the first client and the virtual image of the user of the first client.

With reference to the first aspect or any one of the foregoing implementation manners of the first aspect, in another implementation manner of the first aspect, the method further includes collecting, by the first client, information using a sensor of the terminal in which the first client is located; extracting, by the first client, second driving data which can be used for controlling an action of the virtual image of the user of the first client from the information collected by the sensor; and sending, by the first client, the second driving data to a fourth client, so that the fourth client controls the action of the virtual image of the user of the first client according to the second driving data.

With reference to the first aspect or any one of the foregoing implementation manners of the first aspect, in another implementation manner of the first aspect, the method further includes receiving, by the first client, first operation information collected by the terminal in which the first client is located, where the first operation information is used for indicating an operation of the user of the first client on the virtual image of the user of the second client; controlling, by the first client, the virtual image of the user of the first client and the action of the virtual image of the user of the second client according to the first operation information; and sending, by the first client, the first operation information to the second client.

With reference to the first aspect or any one of the foregoing implementation manners of the first aspect, in another implementation manner of the first aspect, the method further includes receiving, by the first client, second operation information sent by a fifth client, where the second operation information is used for indicating an operation of a user of the fifth client on the virtual image of the user of the first client; and controlling, by the first client, the virtual image of the user of the first client and an action of a virtual image of the user of the fifth client according to the second operation information.

According to a second aspect, a communications method is provided, including generating, by a second client, first driving data, where the first driving data is used for controlling an action of a virtual image of a user of the second client; and sending, by the second client, the first driving data to a first client, so that the first client controls the action of the virtual image, which is presented on a terminal in which the first client is located, of the user of the second client according to the first driving data.

With reference to the second aspect, in an implementation manner of the second aspect, the generating, by a second client, first driving data includes collecting, by the second client, information using a sensor of a terminal in which the second client is located; and extracting, by the second client, the first driving data from the information collected by the sensor.

With reference to any one of the second aspect and the foregoing implementation manner of the second aspect, in another implementation manner of the second aspect, the generating, by a second client, first driving data includes receiving, by the second client, first information input by the user of the second client; and extracting, by the second client, the first driving data from the first information.

According to a third aspect, a client is provided, including a receiving unit configured to receive information from a second client; an obtaining unit configured to obtain first driving data from the information received by the receiving unit, where the first driving data is used for controlling an action of a virtual image of a user of the second client, and the virtual image of the user of the second client is presented on a terminal in which the first client is located; and a control unit configured to control the action of the virtual image of the user of the second client according to the first driving data obtained by the obtaining unit.

With reference to the third aspect, in an implementation manner of the third aspect, the information is information input to the second client by the user of the second client; and the obtaining unit is configured to extract the first driving data from the first information.

With reference to any one of the third aspect and the foregoing implementation manner of the third aspect, in another implementation manner of the third aspect, the information includes the first driving data.

With reference to the third aspect or any one of the foregoing implementation manners of the third aspect, in another implementation manner of the third aspect, the control unit is configured to send the first driving data to a third-party application, so that the third-party application controls the action of the virtual image of the user of the second client according to the first driving data, where the third-party application is used for controlling the virtual image of the user of the second client, and the terminal in which the client is located includes the third-party application.

With reference to the third aspect or any one of the foregoing implementation manners of the third aspect, in another implementation manner of the third aspect, the control unit is configured to invoke a driving function interface corresponding to the virtual image of the user of the second client; and control the action of the virtual image of the user of the second client according to the first driving data and a driving algorithm in the driving function interface.

With reference to the third aspect or any one of the foregoing implementation manners of the third aspect, in another implementation manner of the third aspect, the receiving unit is further configured to receive a user identifier of the second client from the second client or a server; and the client further includes a determining unit configured to determine the virtual image of the user of the second client according to the user identifier of the second client received by the receiving unit.

With reference to the third aspect or any one of the foregoing implementation manners of the third aspect, in another implementation manner of the third aspect, the determining unit is configured to send, to the server, a request used for downloading the virtual image of the user of the second client, where the request carries the user identifier of the second client, and a correspondence between the user identifier of the second client and the virtual image of the user of the second client is stored in the server; and the client receives the virtual image of the user of the second client from the server.

With reference to the third aspect or any one of the foregoing implementation manners of the third aspect, in another implementation manner of the third aspect, the user of the second client has a plurality of available virtual images, and the receiving unit is further configured to receive an indication parameter from the second client or the server, where the indication parameter is used for indicating one of the plurality of available virtual images of the user of the second client; and the determining unit is configured to determine the plurality of available virtual images of the user of the second client according to the user identifier of the second client received by the receiving unit; and determine that the one, which is indicated by the indication parameter, of the plurality of available virtual images of the user of the second client is the virtual image of the user of the second client.

With reference to the third aspect or any one of the foregoing implementation manners of the third aspect, in another implementation manner of the third aspect, the client further includes a first sending unit configured to send a query message to the server, so that the server determines, according to a query condition in the query message, candidate virtual images which satisfy the query condition and are among virtual images stored in the server; the receiving unit is further configured to receive a query result returned by the server, where the query result includes description information of the candidate virtual images; and the client further includes a selecting unit configured to select at least one virtual image as a virtual image of a user of the client from the candidate virtual images according to the description information of the candidate images; and a second sending unit configured to send the selection result to the server, so that the server stores a mapping relationship between the client and the virtual image of the user of the client.

With reference to the third aspect or any one of the foregoing implementation manners of the third aspect, in another implementation manner of the third aspect, the client further includes a collecting unit configured to collect information using a sensor of the terminal in which the client is located; an extracting unit configured to extract second driving data which can be used for controlling an action of the virtual image of the user of the client from the information collected by the sensor; and a third sending unit configured to send the second driving data to a fourth client, so that the fourth client controls the action of the virtual image of the user of the client according to the second driving data.

With reference to the third aspect or any one of the foregoing implementation manners of the third aspect, in another implementation manner of the third aspect, the receiving unit is further configured to receive first operation information collected by the terminal in which the client is located, where the first operation information is used for indicating an operation of the user of the client on the virtual image of the user of the second client; the control unit is further configured to control the virtual image of the user of the client and the action of the virtual image of the user of the second client according to the first operation information; and the client further includes a fourth sending unit configured to send the first operation information to the second client.

With reference to the third aspect or any one of the foregoing implementation manners of the third aspect, in another implementation manner of the third aspect, the receiving unit is further configured to receive second operation information sent by a fifth client, where the second operation information is used for indicating an operation, performed by a user of the fifth client, of the user of the fifth client on the virtual image of the user of the client; and the control unit is further configured to control the virtual image of the user of the client and an action of a virtual image of the user of the fifth client according to the second operation information.

According to a fourth aspect, a client is provided, including a generating unit configured to generate first driving data, where the first driving data is used for controlling an action of a virtual image of a user of the client; and a sending unit configured to send the first driving data generated by the generating unit to a first client, so that the first client controls the action of the virtual image, which is presented on a terminal in which the first client is located, of the user of the client according to the first driving data.

With reference to the fourth aspect, in an implementation manner of the fourth aspect, the generating unit is configured to collect information using a sensor of a terminal in which the client is located; and extract the first driving data from the information collected by the sensor.

With reference to any one of the fourth aspect and the foregoing implementation manner of the fourth aspect, in another implementation manner of the fourth aspect, the generating unit is configured to receive first information input by the user of the client; and extract the first driving data from the first information.

According to a fifth aspect, a terminal is provided. The terminal includes the client according to the third aspect or any one of the foregoing implementation manners of the third aspect.

According to a sixth aspect, a terminal is provided. The terminal includes the client according to the fourth aspect or any one of the foregoing implementation manners of the fourth aspect.

According to a seventh aspect, a terminal is provided, including a receiver configured to receive information from a second client; a memory configured to store a program; and a processor configured to execute the program stored in the memory, where when executed by the processor, the program is used for obtaining first driving data from the information received by the receiver, where the first driving data is used for controlling an action of a virtual image of a user of the second client, and the virtual image of the user of the second client is presented on the terminal; and control the action of the virtual image of the user of the second client according to the first driving data.

With reference to the seventh aspect, in an implementation manner of the seventh aspect, the information is information input to the second client by the user of the second client; and the obtaining, by the processor, first driving data from the information received by the receiver refers to extracting, by the processor, the first driving data from the information.

With reference to any one of the seventh aspect and the foregoing implementation manner of the seventh aspect, in another implementation manner of the seventh aspect, the information includes the first driving data.

With reference to the seventh aspect or any one of the foregoing implementation manners of the seventh aspect, in another implementation manner of the seventh aspect, the controlling, by the processor, the action of the virtual image of the user of the second client according to the first driving data is sending, by the processor, the first driving data to a third-party application, so that the third-party application controls the action of the virtual image of the user of the second client according to the first driving data, where the third-party application is used for controlling the virtual image of the user of the second client, and the terminal includes the third-party application.

With reference to the seventh aspect or any one of the foregoing implementation manners of the seventh aspect, in another implementation manner of the seventh aspect, the controlling, by the processor, the action of the virtual image of the user of the second client according to the first driving data is invoking, by the processor, a driving function interface corresponding to the virtual image of the user of the second client; and controlling the action of the virtual image of the user of the second client according to the first driving data and a driving algorithm in the driving function interface.

With reference to the seventh aspect or any one of the foregoing implementation manners of the seventh aspect, in another implementation manner of the seventh aspect, the receiver is further configured to receive a user identifier of the second client from the second client or a server; and the processor is further configured to determine the virtual image of the user of the second client according to the user identifier of the second client received by the receiver.

With reference to the seventh aspect or any one of the foregoing implementation manners of the seventh aspect, in another implementation manner of the seventh aspect, the terminal further includes a transmitter configured to send data according to an instruction of the processor; the determining, by the processor, the virtual image of the user of the second client according to the user identifier of the second client received by the receiver is instructing, by the processor, the transmitter to send, to the server, a request used for downloading the virtual image of the user of the second client, where the request carries the user identifier of the second client, and a correspondence between the user identifier of the second client and the virtual image of the user of the second client is stored in the server; and the receiver is further configured to receive the virtual image of the user of the second client from the server.

With reference to the seventh aspect or any one of the foregoing implementation manners of the seventh aspect, in another implementation manner of the seventh aspect, the user of the second client has a plurality of available virtual images, and the receiver is further configured to receive an indication parameter from the second client or the server, where the indication parameter is used for indicating one of the plurality of available virtual images of the user of the second client; and the determining, by the processor, the virtual image of the user of the second client according to the user identifier of the second client received by the receiver is determining, by the processor, the plurality of available virtual images of the user of the second client according to the user identifier of the second client received by the receiver; and determining that the one, which is indicated by the indication parameter, of the plurality of available virtual images of the user of the second client is the virtual image of the user of the second client.

With reference to the seventh aspect or any one of the foregoing implementation manners of the seventh aspect, in another implementation manner of the seventh aspect, the transmitter is further configured to send, under the instruction of the processor, a query message to the server, so that the server determines, according to a query condition in the query message, candidate virtual images which satisfy the query condition and are among the virtual images stored in the server; the receiver is further configured to receive a query result returned by the server, where the query result includes description information of the candidate virtual images; the processor is further configured to select, according to the description information of the candidate images, at least one virtual image as a virtual image of a user of the terminal from the candidate virtual images received by the receiver; and the transmitter is further configured to send, under the instruction of the processor, the selection result to the server, so that the server stores a mapping relationship between the terminal and the virtual image of the user of the terminal.

With reference to the seventh aspect or any one of the foregoing implementation manners of the seventh aspect, in another implementation manner of the seventh aspect, the terminal further includes a sensor configured to collect information; the processor is further configured to extract second driving data which can be used for controlling an action of the virtual image of the user of the terminal from the information collected by the sensor; and the transmitter is further configured to send the second driving data to a fourth client according to the instruction of the processor, so that the fourth client controls the action of the virtual image of the user of the terminal according to the second driving data.

With reference to the seventh aspect or any one of the foregoing implementation manners of the seventh aspect, in another implementation manner of the seventh aspect, the receiver is further configured to receive first operation information collected by the terminal, where the first operation information is used for indicating an operation of the user of the terminal on the virtual image of the user of the second client; the processor is further configured to control the virtual image of the user of the terminal and the action of the virtual image of the user of the second client according to the first operation information; and the transmitter is further configured to send the first operation information to the second client according to the instruction of the processor.

With reference to the seventh aspect or any one of the foregoing implementation manners of the seventh aspect, in another implementation manner of the seventh aspect, the operation information is used for indicating an operation of a user of the fifth client on the virtual image of the user of the terminal; and the processor is further configured to control the virtual image of the user of the terminal and an action of a virtual image of the user of the fifth client according to the second operation information.

According to an eighth aspect, a terminal is provided, including a processor configured to generate first driving data, where the first driving data is used for controlling an action of a virtual image of a user of the terminal; and a transmitter configured to send the first driving data generated by the processor to a first client, so that the first client controls the action of the virtual image, which is presented on the first client, of the user of the terminal according to the first driving data, where the virtual image of the user of the terminal is presented on a terminal in which the first client is located.

With reference to the eighth aspect, in an implementation manner of the eighth aspect, the generating, by the processor, first driving data is collecting, by the processor, information using a sensor of the terminal; and extracting the first driving data from the information collected by the sensor.

With reference to any one of the eighth aspect and the foregoing implementation manner of the eighth aspect, in another implementation manner of the eighth aspect, the generating, by the processor, first driving data is controlling, by the processor, a receiver to receive first information input by the user of the terminal; and extracting the first driving data from the first information.

In the embodiment of the present invention, a receiving end obtains driving data from information sent by a sending end, and controls an action of a virtual image of a user of the sending end using the driving data, thereby improving user experience of two communication parties.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to various communications systems, which may be wireless communication systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, and a Universal Mobile Telecommunications System (UMTS); which may also be wired communication systems, for example, a notebook and a desktop communicate via cable broadband; which may further be an end-to-end communication mode, for example, two terminals communicate via Bluetooth.

It should also be understood that in the embodiments of the present invention, a user terminal includes but is not limited to a user equipment (UE), a mobile station (MS), a mobile terminal, a mobile telephone, a handset, and a portable equipment (portable equipment). The terminal may communicate with one or more core networks through a radio access network (RAN). For example, the terminal may be a mobile phone (also referred to as a "cellular" phone) and a computer with a wireless communication function. For example, the terminal may be a portable, pocket-sized, handheld, computer built-in, or vehicle-mounted mobile apparatus.

Figure 1:
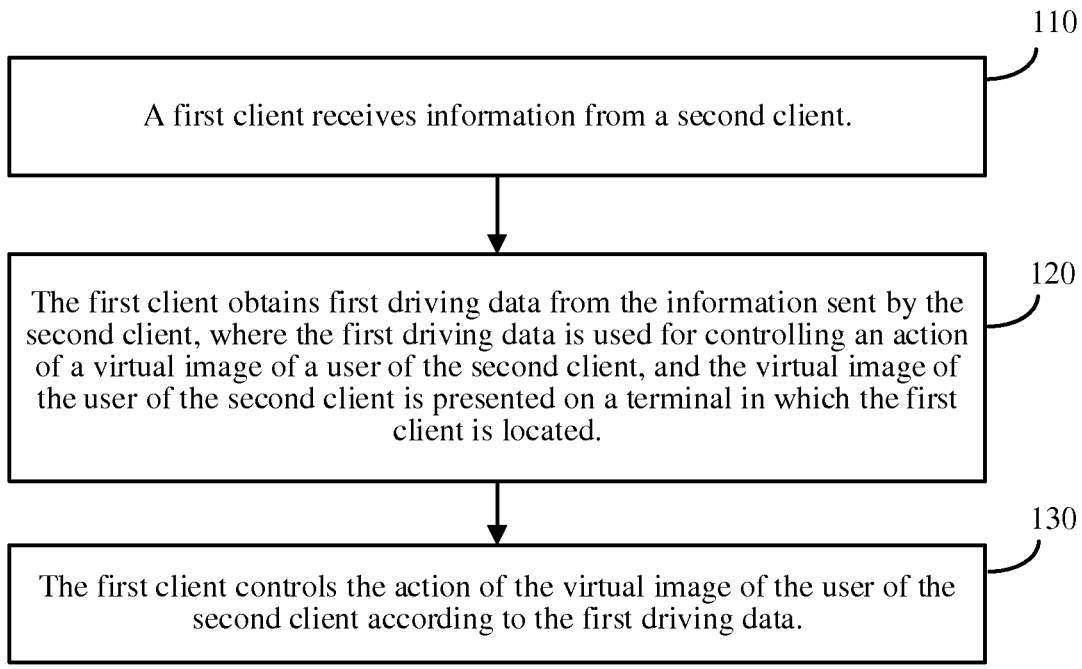
FIG. 1 is a schematic flowchart of a communications method according to an embodiment of the present invention.

FIG. 1 is a schematic flowchart of a communications method according to an embodiment of the present invention. The method in FIG. 1 is executed by a first client, where the first client may be a logical function unit or may be a physical entity.

110: A first client receives information from a second client.

120: The first client obtains first driving data from the information sent by the second client, where the first driving data is used for controlling an action of a virtual image of a user of the second client, and the virtual image of the user of the second client is presented on a terminal in which the first client is located.

130: The first client controls the action of the virtual image of the user of the second client according to the first driving data.

In the embodiment of the present invention, a receiving end obtains driving data from information sent by a sending end, and controls an action of a virtual image of a user of the sending end using the driving data, thereby improving user experience of two communication parties.

The virtual image in the embodiment of the present invention may represent behaviors of the user of the second client, such as speaking, making an expression, and making an action, and these behaviors are shown on the terminal in which the first client is located. The virtual image may be a two dimensional (2D) or 3D cartoon character, for example, Talking Tom Cat.

It should be understood that the method in FIG. 1 is described using communication between the first client and the second client as examples, but the embodiment of the present invention is not limited thereto, and a plurality of parties may communicate at the same time, for example, communication within a group formed by multiple parties.

It should be noted that a specific type of the information sent by the second client in step 110 is not limited in the embodiment of the present invention. The information may be information proactively input by the user of the second client, such as a short message or other text messages or voice messages, and may also be implicit information collected by a sensor of the second client, such as a change of a direction/movement velocity of a terminal; a touch action, a holding action, or shaking of a terminal user; an expression of the user collected by a terminal camera; or other information.

Optionally, in an embodiment, the information in step 110 is information input to the second client by the user of the second client; and the obtaining, by the first client, first driving data from the information sent by the second client may include extracting, by the first client, the first driving data from the information.

For example, the second client may send text information to the first client; and the first client performs fuzzy matching on the text information to obtain a keyword which can express an emotion or a tone of the user of the second client, such as "eh", "?", "alas", or "aha", or directly extracts audio information corresponding to each word in the text information, and controls, using the information as the first driving data, an expression, a mouth shape, or a body action of the virtual image of the user of the second client.

Optionally, in another embodiment, the information in step 110 may include the first driving data.

The second client collects an implicit message using a sensor of a terminal in which the second client is located, and then the second client may extract information which can express a behavioral feature of the user of the second client from the collected implicit message, such as information, which is collected by a front-facing camera, about an expression of the user of the second client, or information, which is collected by a sensor on a touchscreen, about an operation of the second client on the virtual image of the user of the first client. Table 1 shows a comparison between the original information and the extracted information.

TABLE 1

Comparison table of the original information and the extracted information

| Original information | Extracted information | Description |
| --- | --- | --- |
| A head shot taken by a front-facing camera | Category: facial expression Content: smile/anger/being relaxed | |
| A change of a holding direction | Category: screen direction Content: horizontal screen/vertical screen | |
| A touchscreen operation | Category: touch Content: position = head; strength = medium | One party touches the virtual image of the other party on the touchscreen |

As shown in Table 1, the extracted information is indicated in forms of an information category and information content. A specific indication manner may be pre-defined by two communication parties, so that a receiving party can correctly parse the extracted information according to a preset rule. Certainly, other indication manners may also be adopted, such as a shorter pre-defined number and Key-Value, which can reduce the amount of transmitted data.

Then the second client sends the extracted information as the first driving data to the first client, and the first client may directly drive the action of the virtual image of the user of the second client using the first driving data.

Optionally, in another embodiment, when the information sent by the second client in step 110 is information input to the second client, the second client may extract the first driving data from the input information, and then send the first driving data together with the proactively input information to the first client.

A specific manner for the first client to control the action of the virtual image of the user of the second client according to the first driving data in step 120 is not limited in the embodiment of the present invention. For example, a driver is pre-developed for each virtual image, and input and output of driving function interfaces in the driver are defined, where the collected first driving data may be corresponding to the input of the driving function interfaces; or an existing third-party application driving the virtual image may be used, for example, an application of Tom Cat, and in this case, the obtained first driving data is sent to the third-party application, so that the third-party application drives the action of the virtual image of the user of the second client according to the first driving data.

Optionally, in another embodiment, the controlling, by the first client, the action of the virtual image of the user of the second client according to the first driving data may include invoking, by the first client, a driving function interface corresponding to the virtual image of the user of the second client; and controlling, by the first client, the action of the virtual image of the user of the second client according to the first driving data and a driving algorithm in the driving function interface.

Driving the virtual image requires two elements: a virtual image model and driving data. The virtual image model includes the following elements: a driving function interface, an actuator, and a driving algorithm.

The driving function interface is used for receiving driving data and controlling the action of the virtual image. The driving function interface may invoke different driving functions according to different received driving data, for example, invoke a function for controlling a mouth shape of the virtual image when audio driving data is received, or invoke a function for controlling a change of an expression of the virtual image when an interjection is received.

The actuator is used for creating visual, auditory, tactile, and other external effects of the virtual image and forming multimedia content required by the effects. The multimedia content includes a cartoon picture of the virtual image, pictures of various mouth shapes corresponding to basic phonemes of different languages, expression and action pictures corresponding to texts indicating emotions, a background picture, an audio effect, pictures used for decoration, vibration of the terminal, and the like.

The driving algorithm is used for analyzing the input driving data to drive the multimedia content, so that the multimedia content is displayed, played, and triggered according to a predetermined algorithm.

Optionally, in an embodiment, the controlling, by the first client, the action of the virtual image of the user of the second client according to the first driving data may include sending, by the first client, the first driving data to a third-party application, where the third-party application is used for controlling the virtual image of the user of the second client, so that the third-party application controls the action of the virtual image of the user of the second client according to the first driving data.

For example, if the virtual image used by the user of the second client is Tom Cat, after the first driving data is obtained, a Tom Cat program is invoked, to drive an action of Tom. Using this manner, an existing driver may be used, thereby saving costs required for program development.

It should be noted that a manner for setting the virtual image of the user of the second client in step 120 is not limited in the embodiment of the present invention; for example, the virtual image may be set by the first client, or may be set by the second client, or virtual images of information senders may be set to a uniform virtual image.

Optionally, in an embodiment, the determining, by the first client, the virtual image of the user of the second client may include determining, by the first client, the virtual image of the user of the second client according to a user identifier of the second client. For example, virtual images of a plurality of often-contacted users of clients including the second client are stored in the first client; when a message sent by the second client and the user identifier of the second client are received, the virtual image of the user of the second client is matched according to the user identifier. The user identifier of the second client may be provided by the second client, or may also be provided by a server; and the second user identifier may be included in the information in step 110, or may also be a separate piece of information.

When the first client receives the user identifier of the second client but fails to find the virtual image of the second client according to the user identifier, optionally, the determining, by the first client, the virtual image of the user of the second client according to the user identifier of the second client may include sending, by the first client to the server, a request used for downloading the virtual image of the user of the second client, where the request carries the user identifier of the second client, and a correspondence between the user identifier of the second client and the virtual image of the user of the second client is stored in the server; and receiving, by the first client, the virtual image of the user of the second client from the server.

Optionally, in another embodiment, the user of the second client has a plurality of available virtual images, and before the determining, by the first client, the virtual image of the user of the second client according to the user identifier of the second client, the method may further include receiving, by the first client, an indication parameter from the second client or the server, where the indication parameter is used for indicating one of the plurality of available virtual images of the user of the second client; and the determining, by the first client, the virtual image of the user of the second client according to the user identifier of the second client includes determining, by the first client, the plurality of available virtual images of the user of the second client according to the user identifier of the second client; and determining that the one, which is indicated by the indication parameter, of the plurality of available virtual images of the user of the second client is the virtual image of the user of the second client.

The indication parameter may be directly provided by the second client, or may also be provided by the server. The second client pre-stores a correspondence between the virtual images of the user of the second client and the user identifier of the second client in the server, and sets the virtual image adopted when interacting with the first client; and when the second client sends the information to the first client, the server provides the indication parameter according to the setting.

It should be noted that a communication manner of the first client and the second client is not limited in the embodiment of the present invention, and for example, may be a point to point (P2P, point-to-point) manner, or may be a manner of forwarding through the server.

Optionally, the method in FIG. 1 may further include selecting, by the first client, at least one virtual image as a virtual image of a user of the first client from virtual images stored in the server. At the same time, the server may record a correspondence between the first client and the virtual image selected by the first client, so that another client can query the virtual image of the user of the first client using the server.

A specific procedure for the first client to select the virtual image is not limited in the embodiment of the present invention. Optionally, the selecting, by the first client, at least one virtual image as a virtual image of a user of the first client from virtual images stored in the server may include sending, by the first client, a query message to the server, so that the server determines, according to a query condition in the query message, candidate virtual images which satisfy the query condition and are among the virtual images stored in the server; receiving, by the first client, a query result returned by the server, where the query result includes description information of the candidate virtual images; and selecting, by the first client, the at least one virtual image as the virtual image of the user of the first client from the candidate virtual images according to the description information of the candidate images, and sending the selection result to the server, so that the server stores a mapping relationship between the first client and the virtual image of the user of the first client.

Optionally, the first client may further set an attribute of the virtual image of the first client using the server, for example, use different virtual images in different seasons, use different virtual images when communicating with different people, or use different virtual images when in different moods; or may set that the virtual image of the first client is displayed/hidden, a message bubble is displayed/not displayed, or the like.

Optionally, the first client may also be a sending end which sends information to another client, where the information may be information proactively input by the user of the first client or implicit information collected by a sensor of the terminal in which the first client is located.

The method in FIG. 1 may further include collecting, by the first client, information using a sensor of the terminal in which the first client is located; extracting, by the first client, second driving data which can be used for controlling an action of the virtual image of the user of the first client from the information collected by the sensor; and sending, by the first client, the second driving data to a fourth client, so that the fourth client controls the action of the virtual image of the user of the first client according to the second driving data. The fourth client may be the second client, or may be another client excluding the first and second clients.

When communicating, receiving and sending parties may also perform an operation on a virtual image of each other using a touchscreen, and send information about the operation to each other. When the first client is a sending end, the method in FIG. 1 may further include receiving, by the first client, first operation information collected by the terminal in which the first client is located, where the first operation information is used for indicating an operation of the user of the first client on the virtual image of the user of the second client; controlling, by the first client, the virtual image of the user of the first client and the action of the virtual image of the user of the second client according to the first operation information; and sending, by the first client, the first operation information to the second client. When the first client is a receiving end, the method in FIG. 1 may further include receiving, by the first client, second operation information sent by a fifth client, where the second operation information is used for indicating an operation of a user of the fifth client on the virtual image of the user of the first client; and controlling, by the first client, the virtual image of the user of the first client and an action of a virtual image of the user of the fifth client according to the second operation information.

It should be noted that a manner for collecting the first operation information is not limited in the present invention; the collection may be performed using a touchscreen, or may be collected using a hover operation or a gesture recognition technology.

Figure 2:
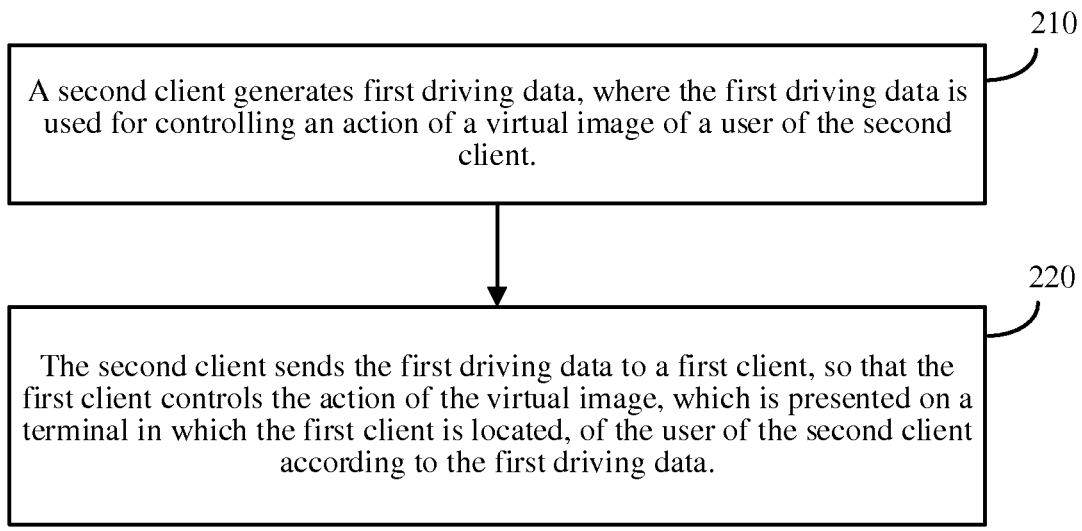
FIG. 2 is a schematic flowchart of a communications method according to another embodiment of the present invention.

The foregoing describes the communications method according to the embodiment of the present invention from the side of the first client with reference to FIG. 1, and the following describes a communications method according to an embodiment of the present invention from the side of the second client with reference to FIG. 2.

FIG. 2 is a schematic flowchart of a communications method according to another embodiment of the present invention. FIG. 2 may be executed by a second client. It should be understood that interaction between a first client and the second client, a related characteristic and function, and the like described from the side of the second client are corresponding to those described from the side of the first client, and therefore repeated descriptions are properly omitted for brevity. The method in FIG. 2 includes the following steps:

210: A second client generates first driving data, where the first driving data is used for controlling an action of a virtual image of a user of the second client.

220: The second client sends the first driving data to a first client, so that the first client controls the action of the virtual image, which is presented on a terminal in which the first client is located, of the user of the second client according to the first driving data.

In the embodiment of the present invention, a receiving end obtains driving data from information sent by a sending end, to control an action of a virtual image of a user of the sending end, thereby improving user experience of two communication parties.

Optionally, in an embodiment, the generating, by the second client, first driving data may include collecting, by the second client, information using a sensor of a terminal in which the second client is located; and extracting, by the second client, the first driving data from the information collected by the sensor.

Optionally, in another embodiment, the generating, by the second client, first driving data may include receiving, by the second client, first information input by the user of the second client; and extracting, by the second client, the first driving data from the first information.

The following describes in further detail the embodiments of the present invention with reference to specific examples. It should be noted that examples in FIG. 3 to FIG. 8 are only intended for helping a person skilled in the art understand the embodiments of the present invention, rather than limiting the embodiments of the present invention to the examples of specific values or specific scenarios. A person skilled in the art can make various equivalent modifications or alterations according to the examples in FIG. 3 to FIG. 8, and such modifications or alterations still fall within the scope of the embodiments of the present invention.

Figure 3:
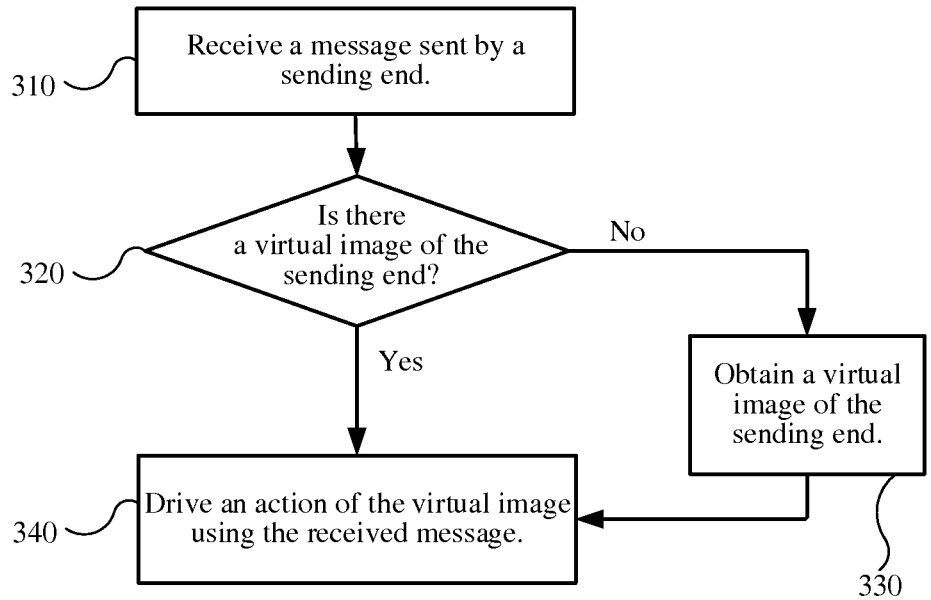
FIG. 3 is a diagram of a main processing procedure in which the communications method according to the embodiment of the present invention is applied.

FIG. 3 is a diagram of a main processing procedure in which the communications method according to the embodiment of the present invention is applied. The procedure in FIG. 3 is executed by a receiving end.

310: Receive a message sent by a sending end.

The message may be a short message, or a voice, or may be driving data obtained by the sending end.

320: Determine whether a receiving end has a virtual image of the sending end, and when the receiving end does not have a virtual image of the sending end, execute 330; and when the receiving end has a virtual image of the sending end, execute 340.

330: Obtain a virtual image of the sending end.

Optionally, the receiving end may set a virtual image for the sending end, or may download a virtual image of the sending end from the server.

340: Drive an action of the virtual image using the received message.

In the embodiment of the present invention, a receiving end obtains driving data from information sent by a sending end, to control an action of a virtual image of a user of the sending end, thereby improving user experience of two communication parties.

Figure 4:
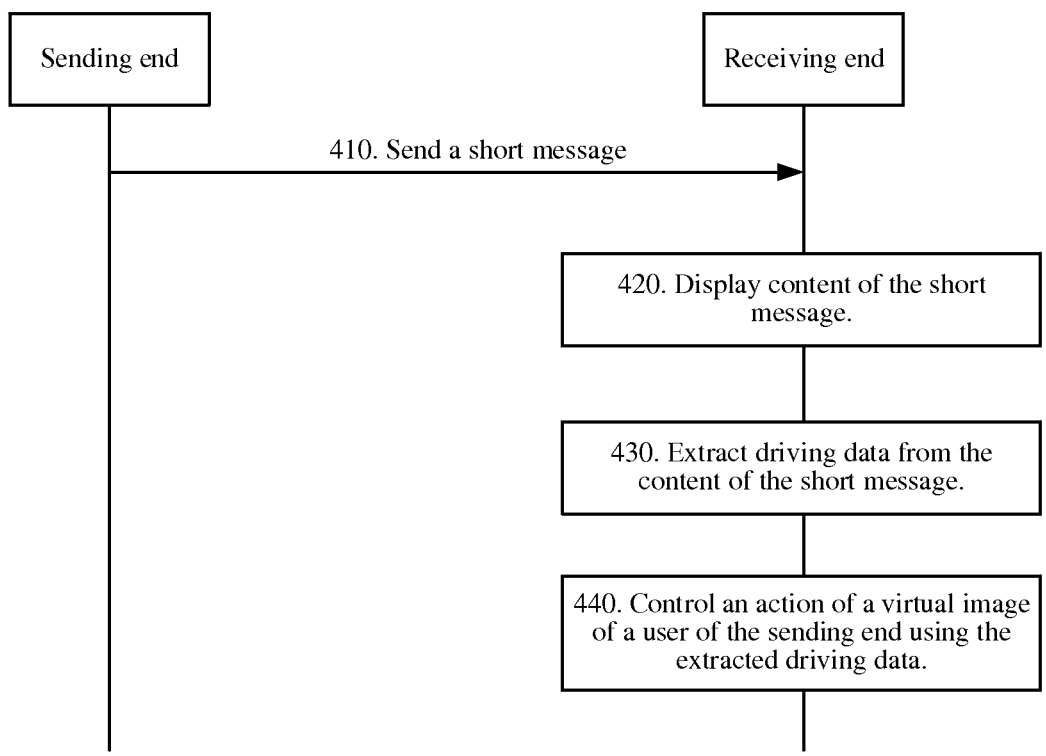
FIG. 4 is a schematic flowchart of a communications method according to another embodiment of the present invention.

FIG. 4 is a schematic flowchart of a communications method according to another embodiment of the present invention. In FIG. 4, a sending end sends a short message to a receiving end, and the receiving end extracts driving data from content of the short message to control an action of a virtual image of the sending end.

410: A sending end sends a short message to a receiving end.

Optionally, information sent by the sending end to the receiving end may also be a voice message or other information proactively input by a user of another sending end.

420: The receiving end displays content of the short message.

Whether to execute this step may be set by the receiving end.

430: The receiving end extracts driving data from the content of the short message.

The driving data is used for driving an action of a virtual image of a user of the sending end.

440: The receiving end controls the action of the virtual image of the user of the sending end using the extracted driving data.

It should be noted that a sequence between the step of displaying the content of the short message and the step of controlling the action of the virtual image is not limited in the embodiment of the present invention; the two steps may be executed at the same time, or the content of the short message is displayed before the action of the virtual image of the sending end is controlled.

In the embodiment of the present invention, a receiving end obtains driving data from information sent by a sending end, to control an action of a virtual image of a user of the sending end, thereby improving user experience of two communication parties.

Figure 5:
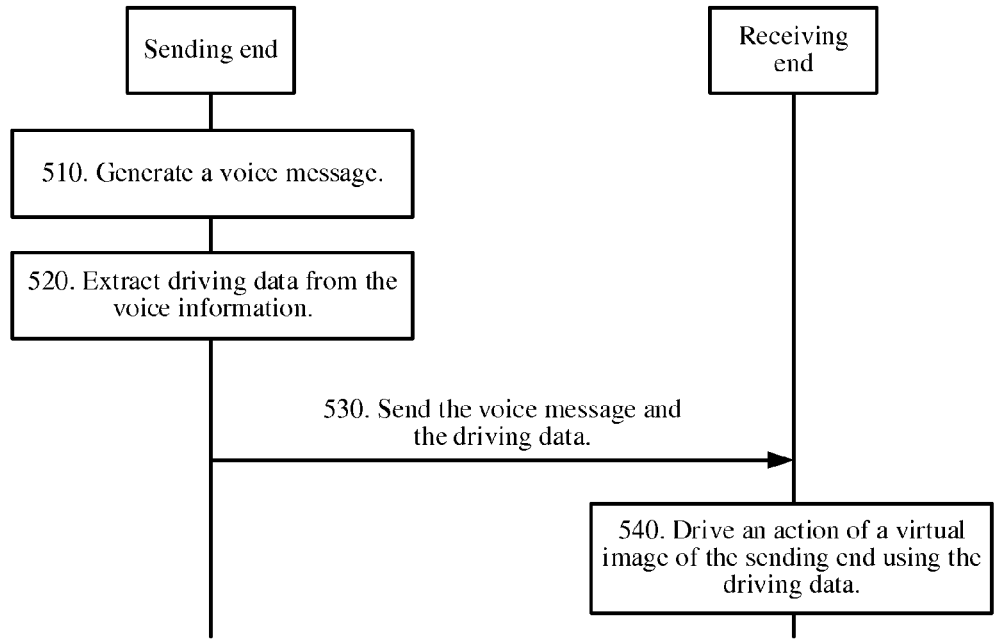
FIG. 5 is a schematic flowchart of a communications method according to another embodiment of the present invention.

FIG. 5 is a schematic flowchart of a communications method according to another embodiment of the present invention. In FIG. 5, a sending end sends a voice message to a receiving end; and at the same time, the sending end extracts driving data from the voice message, to send the driving data along with the voice message to the receiving end, so that the receiving end drives an action of a virtual image of the sending end according to the driving data.

510: A sending end generates a voice message.

For example, a user of the sending end proactively inputs the voice message.

520: The sending end extracts driving data from the voice information.

For example, information such as syllables or phonemes, of the voice is extracted, where the information can be used for driving a change of a mouth shape of a virtual image.

530: The sending end sends the voice message and the driving data to the receiving end.

The voice message and the driving data may be sent separately, or may be sent successively, which is not limited in the embodiment of the present invention.

540: The receiving end drives an action of a virtual image of the sending end using the driving data.

In the embodiment of the present invention, a receiving end obtains driving data from information sent by a sending end, to control an action of a virtual image of a user of the sending end, thereby improving user experience of two communication parties.

Figure 6:
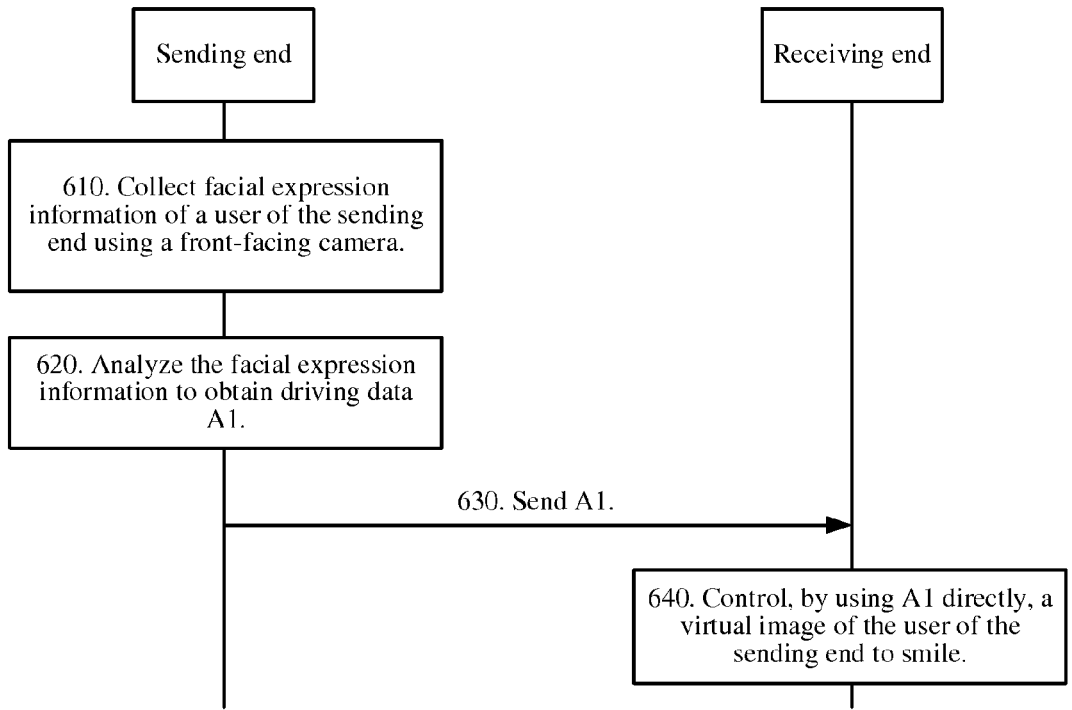
FIG. 6 is a schematic flowchart of a communications method according to another embodiment of the present invention.

FIG. 6 is a schematic flowchart of a communications method according to another embodiment of the present invention. In FIG. 6, a sending end and a receiving end predefine information categories and information content of implicit information; for example, A indicates a facial expression while B indicates a touch action, where A1 indicates a smile, A2 indicates anger, A3 indicates being relaxed, B1 indicates a touch on the head, and B2 indicates a touch on the face. Then the sending end collects facial expression information of a user of the sending end using a front-facing camera, then analyzes the facial expression information, to obtain driving data A1 (that is, the user of the sending end is smiling), and then directly sends A1 to the receiving end; after receiving A1, the receiving end controls a virtual image of the user of the sending end to smile. A specific procedure is as follows:

610: A sending end collects facial expression information of a user of the sending end using a front-facing camera.

620: The sending end analyzes the facial expression information to obtain driving data A1.

630: The sending end sends A1 to a receiving end.

640: The receiving end controls, using A1, a virtual image of the user of the sending end to smile.

In the embodiment of the present invention, a receiving end obtains driving data from information sent by a sending end, to control an action of a virtual image of a user of the sending end, thereby improving user experience of two communication parties.

Figure 7:
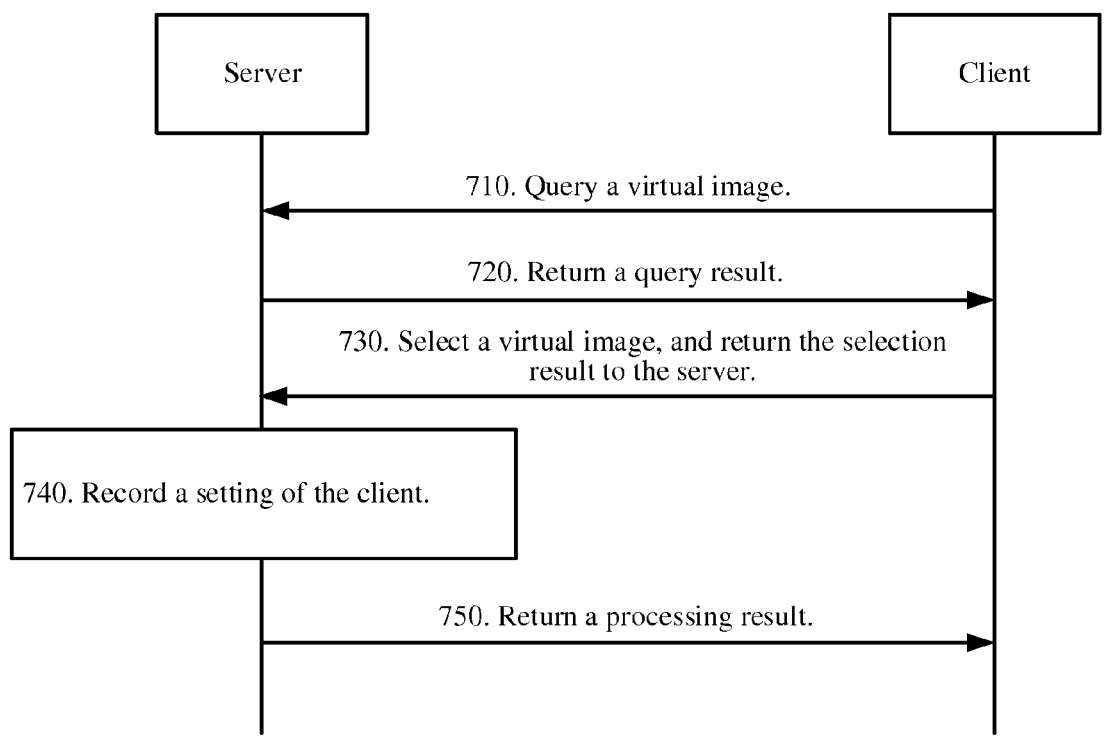
FIG. 7 is a diagram of a procedure for setting a virtual image of a client according to an embodiment of the present invention.

FIG. 7 is a diagram of a procedure for setting a virtual image of a client according to an embodiment of the present invention. The procedure in FIG. 7 is applicable to a scenario where clients interact with each other using a server, where a great number of virtual images are stored in a server, each client needs to set a respective virtual image by interacting with the server, and a correspondence between each client and a virtual image is stored in the server.

710: A client queries a virtual image.

When querying the virtual image, the client may input a query condition, so that a server returns a query result according to the query condition.

720: A server returns a query result.

The query result may be information about virtual images which satisfy the query condition, such as identifiers of the virtual images, description information of the virtual images, and effect pictures.

730: The client selects a virtual image, and returns the selection result to the server.

The returned result may carry an identifier of the selected virtual image. Certainly, a user of a client may be corresponding to one virtual image, or may be corresponding to a plurality of virtual images, so as to use different virtual images in different occasions.

740: The server records a setting of the client.

For example, the server records a correspondence between a user identifier of the client and the selected virtual image.

750: Return a processing result.

Figure 8:
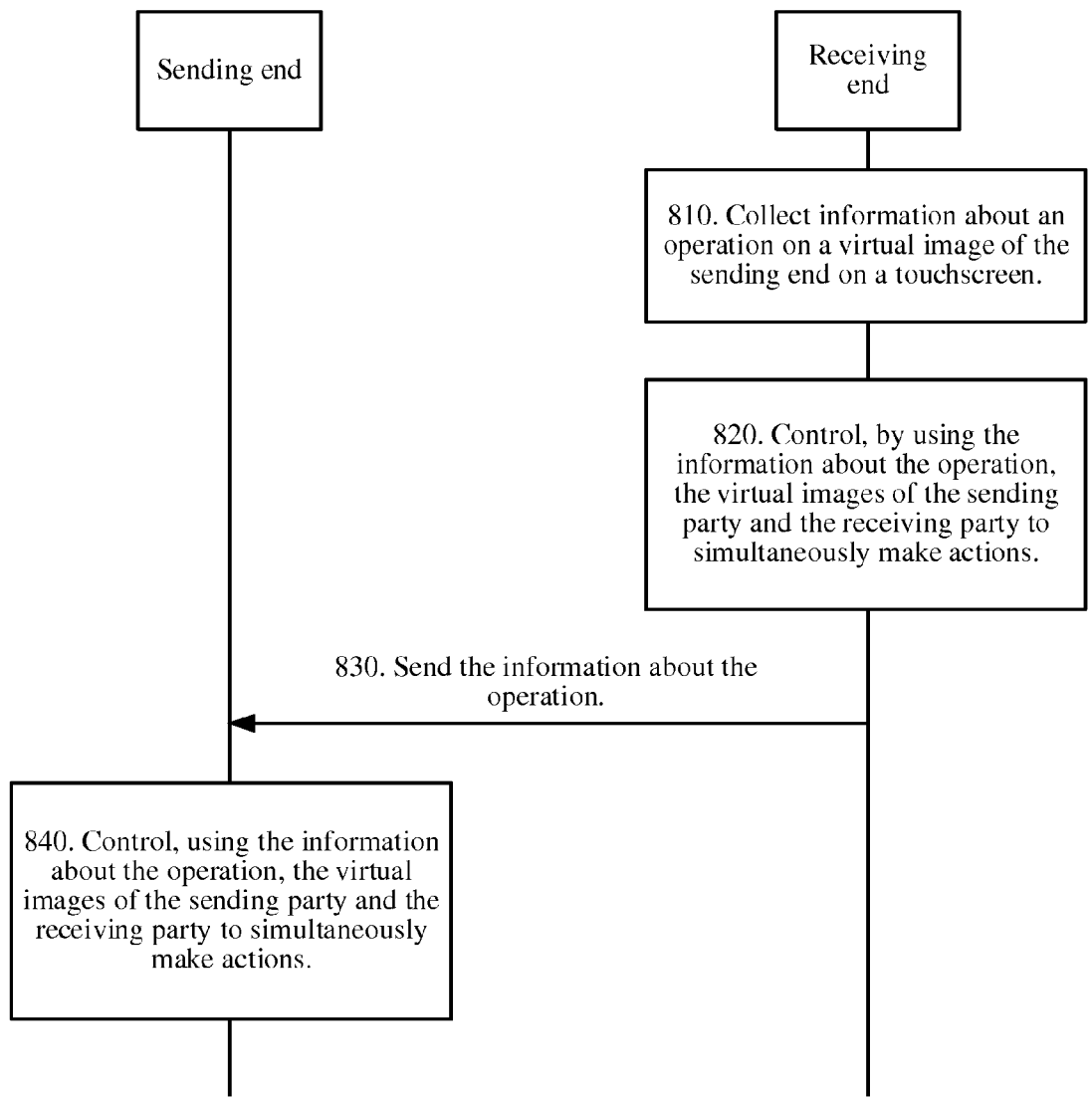
FIG. 8 is a flowchart of a method for operating a virtual image of a sending end by a receiving end according to an embodiment of the present invention.

FIG. 8 is a flowchart of a method for operating a virtual image of a sending end by a receiving end according to an embodiment of the present invention. In FIG. 8, the sending end and the receiving end currently communicate with each other, and present a virtual image of each other, for example, display the virtual image of each other on a touchscreen; and the receiving end performs an operation on a virtual image of the sending end by touching a touchscreen or using a gesture.

810: A receiving end collects information about an operation on a virtual image of a sending end.

The information about the operation may be information obtained by recognizing a gesture of a user, or may also be information about a touch of a user received using a touchscreen, which may include an operating position such as the head, a hand, or the mouth of the virtual image; an operating manner such as tap, double-tap, or slide; an operating strength such as great, medium, or small; or an operating duration such as short, medium, or long.

820: The receiving end controls, using the information about the operation, the virtual images of the sending end and the receiving end to simultaneously make actions.

Optionally, the receiving end generates driving data according to the information about the operation, and invokes a corresponding driving function according to the driving data, to control the virtual images of the sending end and the receiving end to simultaneously make actions.

Both the virtual image of the sending party and the virtual image of the receiving party are displayed the touchscreen of the receiving end. In this case, if the information about the operation collected by the receiving end is hitting Tom Cat on the head, the receiving end simultaneously controls the virtual image of the receiving end to make a hitting action and the virtual image of the sending end to make a dodging action.

830: The receiving end sends the information about the operation to the sending end.

Optionally, the receiving end may send the driving data, which is generated in step 820 to drive the virtual image, to the sending end.

840: The sending end controls, using the information about the operation, the virtual images of the sending party and the receiving party to simultaneously make actions.

The following describes in detail the communications method according to the embodiments of the present invention with reference to FIG. 1 to FIG. 8, and the following describes in detail clients and terminals according to embodiments of the present invention with reference to FIG. 9 to FIG. 14.

Figure 9:
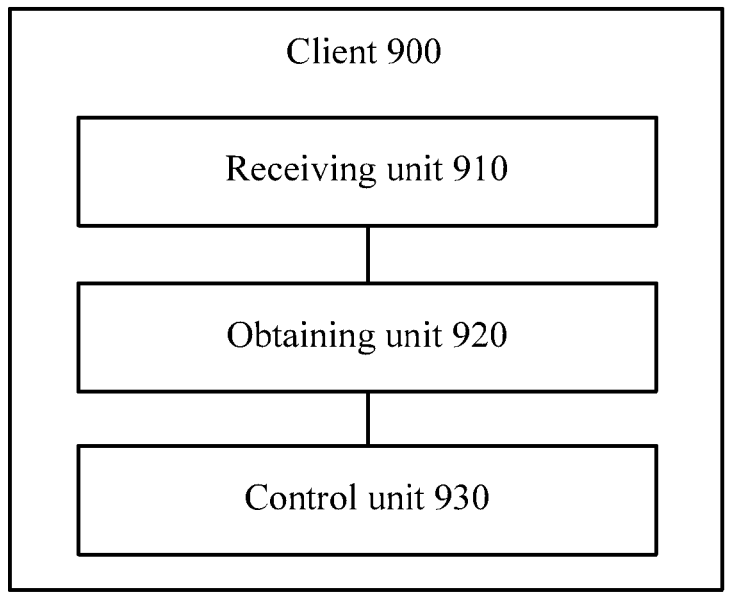
FIG. 9 is a schematic structural block diagram of a client according to an embodiment of the present invention.

FIG. 9 is a schematic structural block diagram of a client according to an embodiment of the present invention. The client in FIG. 9 is capable of performing the steps executed by the first client in FIG. 1 to FIG. 8. A client 900 in FIG. 9 includes a receiving unit 910, an obtaining unit 920, and a control unit 930.

The receiving unit 910 is configured to receive information from a second client.

The obtaining unit 920 is configured to obtain first driving data from the information received by the receiving unit 910, where the first driving data is used for controlling an action of a virtual image of a user of the second client.

The control unit 930 is configured to control the action of the virtual image of the user of the second client according to the first driving data obtained by the obtaining unit 920.

In the embodiment of the present invention, a receiving end obtains driving data from information sent by a sending end, to control an action of a virtual image of a user of the sending end, thereby improving user experience of two communication parties.

Optionally, in an embodiment, the information is information input to the second client by the user of the second client; and the obtaining unit 920 is configured to extract the first driving data from first information.

Optionally, in another embodiment, the information includes the first driving data.

Optionally, in another embodiment, the control unit 930 is configured to send the first driving data to a third-party application, so that the third-party application controls the action of the virtual image of the user of the second client according to the first driving data, where the third-party application is used for controlling the virtual image of the user of the second client, and a terminal in which the client is located includes the third-party application.

Optionally, in another embodiment, the control unit 930 is configured to invoke a driving function interface corresponding to the virtual image of the user of the second client, where the driving function interface is a function interface of the virtual image of the user of the second client; and control the action of the virtual image of the user of the second client according to the first driving data and a driving algorithm in the driving function interface.

Optionally, in another embodiment, the receiving unit 910 is further configured to receive a user identifier of the second client from the second client or a server, where the user identifier of the second client is carried in information; and the client 900 further includes a determining unit configured to determine the virtual image of the user of the second client according to the user identifier of the second client.

Optionally, in another embodiment, the determining unit is configured to send, to the server, a request used for downloading the virtual image of the user of the second client, where the request carries the user identifier of the second client, and a correspondence between the user identifier of the second client and the virtual image of the user of the second client is stored in the server; and the client 900 receives the virtual image of the user of the second client from the server.

Optionally, in another embodiment, the user of the second client has a plurality of available virtual images, and the receiving unit 910 is further configured to receive an indication parameter from the second client or the server, where the indication parameter is used for indicating which one of the plurality of available virtual images is the virtual image of the user of the second client; and the determining unit is configured to determine the plurality of available virtual images of the user of the second client according to the user identifier of the second client received by the receiving unit 910; and determine that the one, which is indicated by the indication parameter, of the plurality of available virtual images of the user of the second client is the virtual image of the user of the second client.

Optionally, in another embodiment, the client 900 further includes a first sending unit configured to send a query message to the server, so that the server determines, according to a query condition in the query message, candidate virtual images which satisfy the query condition and are among virtual images stored in the server; the receiving unit 910 is further configured to receive a query result returned by the server, where the query result includes description information of the candidate virtual images; the client 900 further includes a selecting unit configured to select at least one virtual image as a virtual image of a user of the client 900 from the candidate virtual images according to the description information of the candidate images; and a second sending unit configured to send the selection result to the server, so that the server stores a mapping relationship between the client 900 and the virtual image of the user of the client 900.

Optionally, in another embodiment, the client 900 further includes a collecting unit configured to collect information using a sensor of the terminal in which the client 900 is located; an extracting unit configured to extract second driving data which can be used for controlling an action of the virtual image of the user of the client 900 from the information collected by the sensor; and a third sending unit configured to send the second driving data to a fourth client, so that the fourth client controls the action of the virtual image of the user of the client 900 according to the second driving data.

Optionally, in another embodiment, the receiving unit 910 is further configured to receive first operation information collected by the terminal in which the client 900 is located, where the first operation information is used for indicating that the virtual image of the user of the second client to the user of the client 900 is operated by the user of the client; the control unit 930 is further configured to control the virtual image of the user of the client 900 and the action of the virtual image of the user of the second client according to the first operation information; and the client 900 further includes a fourth sending unit configured to send the first operation information to the second client.

Optionally, in another embodiment, the receiving unit 910 is further configured to receive second operation information sent by a fifth client, where the second operation information is used for indicating that the virtual image of the user of the client 900 to a user of the fifth client is operated by the user of the fifth client; and the control unit is further configured to control the virtual image of the user of the client 900 and an action of a virtual image of the user of the fifth client according to the second operation information.

Figure 10:
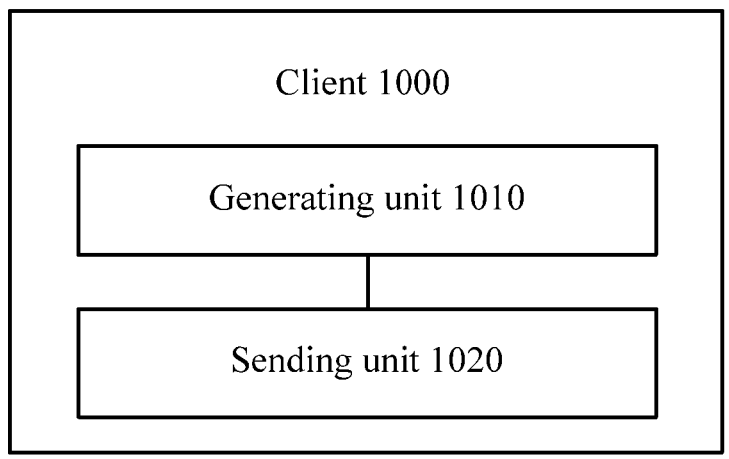
FIG. 10 is a schematic structural block diagram of a client according to another embodiment of the present invention.

FIG. 10 is a schematic structural block diagram of a client according to another embodiment of the present invention. The client in FIG. 10 can perform the steps executed by the second client in FIG. 1 to FIG. 8. A client 1000 in FIG. 10 includes a generating unit 1010 and a sending unit 1020.

The generating unit 1010 is configured to generate first driving data, where the first driving data is used for controlling an action of a virtual image of a user of the client; and the sending unit 1020 is configured to send the first driving data generated by the generating unit 1010 to a first client, so that the first client controls the action of the virtual image, which is presented on the terminal, of the user of the client according to the first driving data.

In the embodiment of the present invention, a receiving end obtains driving data from information sent by a sending end, and controls an action of a virtual image of a user of the sending end using the driving data, thereby improving user experience of two communication parties.

Optionally, in an embodiment, the generating unit 1010 is configured to collect information using a sensor of a terminal in which the client is located; and extract the first driving data from the information collected by the sensor.

Optionally, in another embodiment, the generating unit 1010 is configured to receive first information input by the user of the client 1000; and extract the first driving data from the first information.

Figure 11:
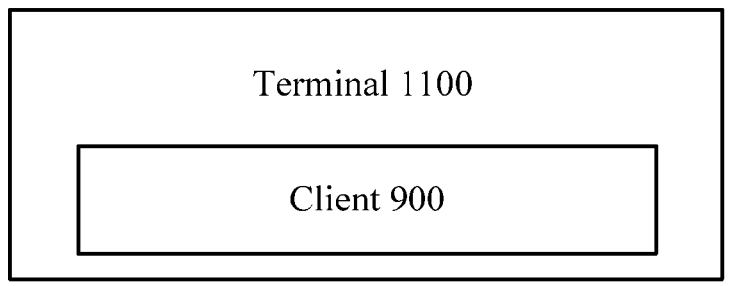
FIG. 11 is a schematic structural block diagram of a terminal according to an embodiment of the present invention.

FIG. 11 is a schematic structural block diagram of a terminal according to an embodiment of the present invention. A terminal 1100 in FIG. 11 includes the client 900 described in FIG. 9.

In the embodiment of the present invention, a receiving end obtains driving data from information sent by a sending end, and controls an action of a virtual image of a user of the sending end using the driving data, thereby improving user experience of two communication parties.

Figure 12:
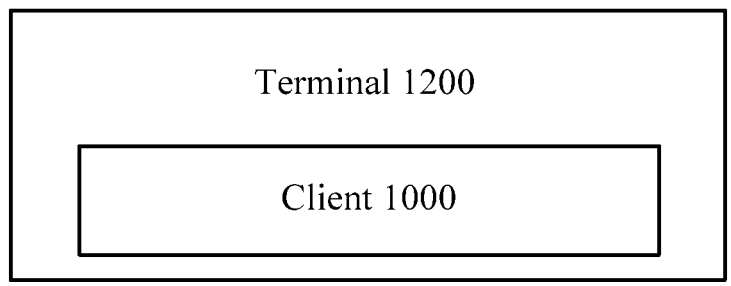
FIG. 12 is a schematic structural block diagram of a terminal according to another embodiment of the present invention.

FIG. 12 is a schematic structural block diagram of a terminal according to another embodiment of the present invention. A terminal 1200 in FIG. 12 includes the client 1000 described in FIG. 10.

Figure 13:
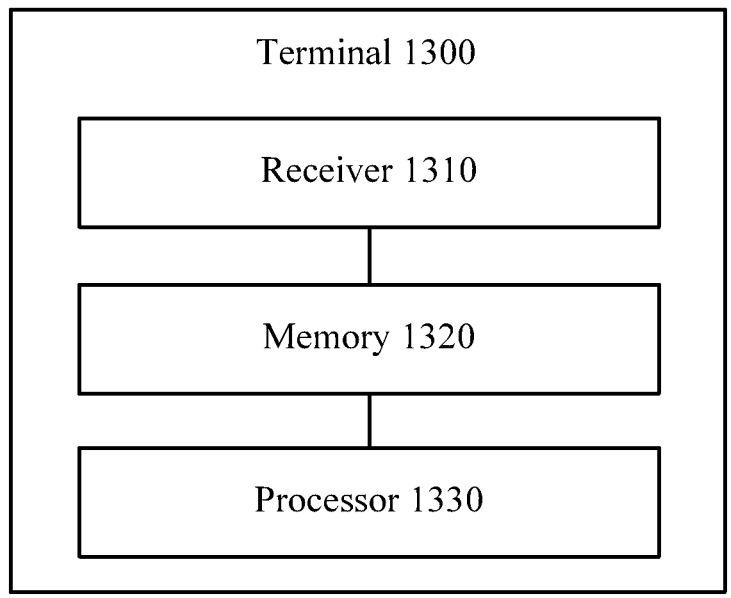
FIG. 13 is a schematic structural block diagram of a terminal according to another embodiment of the present invention.

FIG. 13 is a schematic structural block diagram of a terminal according to another embodiment of the present invention. A terminal 1300 in FIG. 13 includes a receiver 1310, a memory 1320, and a processor 1330.

The receiver 1310 is configured to receive information from a second client; the memory 1320 is configured to store a program; and the processor 1330 is configured to execute the program stored in the memory 1320, where when executed by the processor 1330, the program is used for obtaining first driving data from the information received by the receiver 1310, where the first driving data is used for controlling an action of a virtual image of a user of the second client, and the virtual image of the user of the second client is presented on the terminal 1300; and control the action of the virtual image of the user of the second client according to the first driving data.

In the embodiment of the present invention, a receiving end obtains driving data from information sent by a sending end, and controls an action of a virtual image of a user of the sending end using the driving data, thereby improving user experience of two communication parties.

Optionally, in an embodiment, the information is information input to the second client by the user of the second client; and the obtaining, by the processor 1330, first driving data from the information received by the receiver 1310 refers to extracting, by the processor 1330, the first driving data from the information.

Optionally, in another embodiment, the information includes the first driving data.

Optionally, in another embodiment, the controlling, by the processor 1330, the action of the virtual image of the user of the second client according to the first driving data is sending, by the processor 1330, the first driving data to a third-party application, so that the third-party application controls the action of the virtual image of the user of the second client according to the first driving data, where the third-party application is used for controlling the virtual image of the user of the second client, and the terminal 1300 includes the third-party application.

Optionally, in another embodiment, the controlling, by the processor 1330, the action of the virtual image of the user of the second client according to the first driving data is invoking, by the processor 1330, a driving function interface corresponding to the virtual image of the user of the second client; and controlling the action of the virtual image of the user of the second client according to the first driving data and a driving algorithm in the driving function interface.

Optionally, in another embodiment, the receiver 1310 is further configured to receive a user identifier of the second client from the second client or a server; and the processor 1330 is further configured to determine the virtual image of the user of the second client according to the user identifier of the second client received by the receiver 1310.

Optionally, in another embodiment, the terminal 1300 further includes a transmitter configured to send data according to an instruction of the processor 1330; the determining, by the processor 1330, the virtual image of the user of the second client according to the user identifier of the second client received by the receiver 1310 is instructing, by the processor 1330, the transmitter to send, to the server, a request used for downloading the virtual image of the user of the second client, where the request carries the user identifier of the second client, and a correspondence between the user identifier of the second client and the virtual image of the user of the second client is stored in the server; and the receiver 1310 is further configured to receive the virtual image of the user of the second client from the server.

Optionally, in another embodiment, the user of the second client has a plurality of available virtual images, and the receiver 1310 is further configured to receive an indication parameter from the second client or the server, where the indication parameter is used for indicating one of the plurality of available virtual images of the user of the second client; and the determining, by the processor 1330, the virtual image of the user of the second client according to the user identifier of the second client received by the receiver 1310 is determining, by the processor 1330, the plurality of available virtual images of the user of the second client according to the user identifier of the second client received by the receiver 1310; and determining that the one, which is indicated by the indication parameter, of the plurality of available virtual images of the user of the second client is the virtual image of the user of the second client.

Optionally, in another embodiment, the transmitter is further configured to send, under the instruction of the processor 1330, a query message to the server, so that the server determines, according to a query condition in the query message, candidate virtual images which satisfy the query condition and are among the virtual images stored in the server; the receiver 1310 is further configured to receive a query result returned by the server, where the query result includes description information of the candidate virtual images; the processor 1330 is further configured to select, according to the description information of the candidate images, at least one virtual image as a virtual image of a user of the terminal from the candidate virtual images received by the receiver 1310; and the transmitter is further configured to send, under the instruction of the processor, the selection result to the server, so that the server stores a mapping relationship between the terminal 1300 and the virtual image of the user of the terminal 1300.

Optionally, in another embodiment, the terminal 1300 further includes a sensor configured to collect information; the processor 1330 is further configured to extract second driving data which can be used for controlling an action of the virtual image of the user of the terminal 1300 from the information collected by the sensor; and the transmitter is further configured to send the second driving data to a fourth client according to the instruction of the processor 1330, so that the fourth client controls the action of the virtual image of the user of the terminal 1300 according to the second driving data.

Optionally, in another embodiment, the receiver 1310 is further configured to receive first operation information collected by the terminal 1300, where the first operation information is used for indicating an operation of the user of the terminal 1300 on the virtual image of the user of the second client; the processor 1330 is further configured to control the virtual image of the user of the terminal and the action of the virtual image of the user of the second client according to the first operation information; and the transmitter is further configured to send the first operation information to the second client according to the instruction of the processor 1330.

Optionally, in another embodiment, the receiver 1310 is further configured to receive second operation information sent by a fifth client, where the second operation information is used for indicating an operation of a user of the fifth client on the virtual image of the user of the terminal; and the processor 1330 is further configured to control the virtual image of the user of the terminal and an action of a virtual image of the user of the fifth client according to the second operation information.

Figure 14:
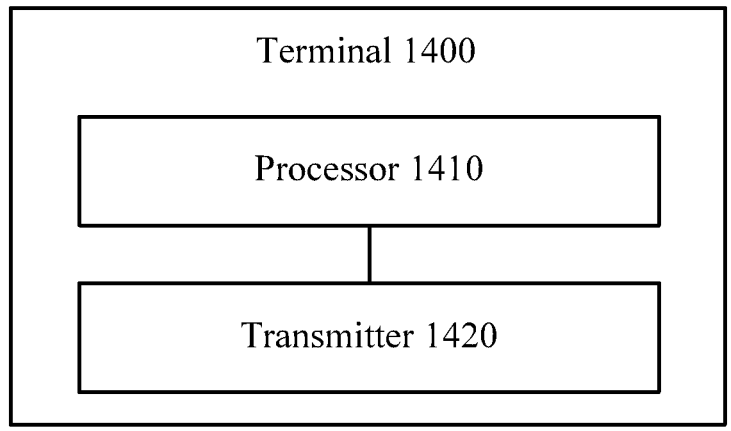
FIG. 14 is a schematic structural block diagram of a terminal according to another embodiment of the present invention

FIG. 14 is a schematic structural block diagram of a terminal according to another embodiment of the present invention. A terminal 1400 in FIG. 14 includes a processor 1410 and a transmitter 1420.

The processor 1410 is configured to generate first driving data, where the first driving data is used for controlling an action of a virtual image of a user of the terminal 1400; and the transmitter 1420 is configured to send the first driving data generated by the processor 1410 to a first client, so that the first client controls the action of the virtual image, which is presented on the first client, of the user of the terminal 1400 according to the first driving data, where the virtual image of the user of the terminal 1400 is presented on a terminal in which the first client is located.

In the embodiment of the present invention, a receiving end obtains driving data from information sent by a sending end, and controls an action of a virtual image of a user of the sending end using the driving data, thereby improving user experience of two communication parties.

Optionally, in an embodiment, the generating, by the processor 1410, first driving data is collecting, by the processor 1410, information using a sensor of the terminal 1400; and extracting the first driving data from the information collected by the sensor.

Optionally, in another embodiment, the generating, by the processor 1410, first driving data is controlling, by the processor 1410, a receiver to receive first information input by the user of the terminal 1400; and extracting the first driving data from the first information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communications method comprising:
    receiving, by a first client, information from a second client;
    obtaining, by the first client, first driving data from the information, wherein the first driving data is used for controlling an action of a virtual image of a user of the second client, and wherein the virtual image of the user of the second client is presented on a terminal in which the first client is located; and
    controlling, by the first client, the action of the virtual image of the user of the second client according to the first driving data.

2. The method according to claim 1, wherein the information is information input to the second client by the user of the second client, and wherein obtaining, by the first client, the first driving data from the information comprises extracting, by the first client, the first driving data from the information.

3. The method according to claim 1, wherein the information comprises the first driving data.

4. The method according to claim 1, wherein controlling, by the first client, the action of the virtual image of the user of the second client according to the first driving data comprises sending, by the first client, the first driving data to a third-party application, so that the third-party application controls the action of the virtual image of the user of the second client according to the first driving data, wherein the third-party application is used for controlling the virtual image of the user of the second client, and wherein the terminal in which the first client is located comprises the third-party application.

5. The method according to claim 1, wherein controlling, by the first client, the action of the virtual image of the user of the second client according to the first driving data comprises:
- invoking, by the first client, a driving function interface corresponding to the virtual image of the user of the second client; and
- controlling, by the first client, the action of the virtual image of the user of the second client according to the first driving data and a driving algorithm in the driving function interface.

6. The method according to claim 1, wherein before controlling, by the first client, the action of the virtual image of the user of the second client according to the first driving data, the method further comprises:
- receiving, by the first client, a user identifier of the second client from the second client or a server; and
- determining, by the first client, the virtual image of the user of the second client according to the user identifier of the second client.

7. The method according to claim 6, wherein determining, by the first client, the virtual image of the user of the second client according to the user identifier of the second client comprises:
- sending, by the first client to the server, a request used for downloading the virtual image of the user of the second client, wherein the request carries the user identifier of the second client, and wherein a correspondence between the user identifier of the second client and the virtual image of the user of the second client is stored in the server; and
- receiving, by the first client, the virtual image of the user of the second client from the server.

8. The method according to claim 6, wherein the user of the second client has a plurality of available virtual images, and wherein before determining, by the first client, the virtual image of the user of the second client according to the user identifier of the second client, the method further comprises receiving, by the first client, an indication parameter from the second client or the server, wherein the indication parameter is used for indicating one of the plurality of available virtual images of the user of the second client, and wherein determining, by the first client, the virtual image of the user of the second client according to the user identifier of the second client comprises:
- determining, by the first client, the plurality of available virtual images of the user of the second client according to the user identifier of the second client; and
- determining that the one, which is indicated by the indication parameter, of the plurality of available virtual images of the user of the second client is the virtual image of the user of the second client.

9. The method according to claim 1, further comprising:
- sending, by the first client, a query message to the server, so that the server determines, according to a query condition in the query message, candidate virtual images which satisfy the query condition and are among virtual images stored in the server;
- receiving, by the first client, a query result returned by the server, wherein the query result comprises description information of the candidate virtual images;
- selecting, by the first client, at least one virtual image as a virtual image of a user of the first client from the candidate virtual images according to the description information of the candidate images; and
- sending the selection result to the server, so that the server stores a mapping relationship between the first client and the virtual image of the user of the first client.

10. The method according to claim 1, further comprising:
- collecting, by the first client, information using a sensor of the terminal in which the first client is located;
- extracting, by the first client, second driving data which can be used for controlling an action of the virtual image of the user of the first client from the information collected by the sensor; and
- sending, by the first client, the second driving data to a fourth client, so that the fourth client controls the action of the virtual image of the user of the first client according to the second driving data.

11. The method according to claim 1, further comprising:
- receiving, by the first client, first operation information collected by the terminal in which the first client is located, wherein the first operation information is used for indicating an operation of the user of the first client on the virtual image of the user of the second client;
- controlling, by the first client, the virtual image of the user of the first client and the action of the virtual image of the user of the second client according to the first operation information; and
- sending, by the first client, the first operation information to the second client.

12. The method according to claim 1, further comprising:
- receiving, by the first client, second operation information sent by a fifth client, wherein the second operation information is used for indicating an operation of a user of the fifth client on the virtual image of the user of the first client; and
- controlling, by the first client, the virtual image of the user of the first client and an action of a virtual image of the user of the fifth client according to the second operation information.

13. A terminal comprising:
- a processor configured to generate first driving data, wherein the first driving data is used for controlling an action of a virtual image of a user of the terminal; and
- a transmitter configured to send the first driving data generated by the processor to a first client, so that the first client controls the action of the virtual image, which is presented on the first client, of the user of the terminal according to the first driving data, wherein the virtual image of the user of the terminal is presented on a terminal in which the first client is located.

14. The terminal according to claim 13, wherein generating, by the processor, the first driving data comprises:
- collecting, by the processor, information using a sensor of the terminal; and
- extracting the first driving data from the information collected by the sensor.

15. The terminal according to claim 13, wherein generating, by the processor, the first driving data comprises:
- controlling, by the processor, a receiver to receive first information input by the user of the terminal; and
- extracting the first driving data from the first information.

16. A terminal comprising:
- a receiver configured to receive information from a second client;
- a memory configured to store a program; and
- a processor configured to execute the program stored in the memory, wherein when executed by the processor, the program is operable to:
- obtain first driving data from the information received by the receiver, wherein the first driving data is used for controlling an action of a virtual image of a user of the second client, and wherein the virtual image of the user of the second client is presented on the terminal; and control the action of the virtual image of the user of the second client according to the first driving data.

17. The terminal according to claim 16, wherein the information input to the second client by the user of the second client; and wherein obtaining, by the processor, the first driving data from the information received by the receiver comprises extracting, by the processor, the first driving data from the information.

18. The terminal according to claim 16, wherein the information comprises the first driving data.

19. The terminal according to claim 16, wherein controlling, by the processor, the action of the virtual image of the user of the second client according to the first driving data comprises sending, by the processor, the first driving data to a third-party application, so that the third-party application controls the action of the virtual image of the user of the second client according to the first driving data, wherein the third-party application is used for controlling the virtual image of the user of the second client, and wherein the terminal comprises the third-party application.

20. The terminal according to claim 16, wherein controlling, by the processor, the action of the virtual image of the user of the second client according to the first driving data comprises:
 invoking, by the processor, a driving function interface corresponding to the virtual image of the user of the second client; and
 controlling the action of the virtual image of the user of the second client according to the first driving data and a driving algorithm in the driving function interface.

21. The terminal according to claim 16, wherein the receiver is further configured to receive a user identifier of the second client from the second client or a server, and wherein the processor is further configured to determine the virtual image of the user of the second client according to the user identifier of the second client received by the receiver.

22. The terminal according to claim 21, wherein the terminal further comprises a transmitter configured to send data according to an instruction of the processor, wherein determining, by the processor, the virtual image of the user of the second client according to the user identifier of the second client received by the receiver comprises instructing, by the processor, the transmitter to send, to the server, a request used for downloading the virtual image of the user of the second client, wherein the request carries the user identifier of the second client, and wherein a correspondence between the user identifier of the second client and the virtual image of the user of the second client is stored in the server, and wherein the receiver is further configured to receive the virtual image of the user of the second client from the server.

23. The terminal according to claim 21, wherein the user of the second client has a plurality of available virtual images, wherein the receiver is further configured to receive an indication parameter from the second client or the server, wherein the indication parameter is used for indicating one of the plurality of available virtual images of the user of the second client, and wherein determining, by the processor, the virtual image of the user of the second client according to the user identifier of the second client received by the receiver comprises:
 determining, by the processor, the plurality of available virtual images of the user of the second client according to the user identifier of the second client received by the receiver; and
 determining that the one, which is indicated by the indication parameter, of the plurality of available virtual images of the user of the second client is the virtual image of the user of the second client.

24. The terminal according to claim 16, wherein the transmitter is further configured to send, under the instruction of the processor, a query message to the server, so that the server determines, according to a query condition in the query message, candidate virtual images which satisfy the query condition and are among the virtual images stored in the server, wherein the receiver is further configured to receive a query result returned by the server, wherein the query result comprises description information of the candidate virtual images, wherein the processor is further configured to select, according to the description information of the candidate images, at least one virtual image as a virtual image of a user of the terminal from the candidate virtual images received by the receiver, and wherein the transmitter is further configured to send, under the instruction of the processor, the selection result to the server, so that the server stores a mapping relationship between the terminal and the virtual image of the user of the terminal.

25. The terminal according to claim 16, further comprising a sensor configured to collect information, wherein the processor is further configured to extract second driving data which can be used for controlling an action of the virtual image of the user of the terminal from the information collected by the sensor, and wherein the transmitter is further configured to send the second driving data to a fourth client according to the instruction of the processor, so that the fourth client controls the action of the virtual image of the user of the terminal according to the second driving data.

26. The terminal according to claim 16, wherein the receiver is further configured to receive first operation information collected by the terminal, wherein the first operation information is used for indicating an operation of the user of the terminal on the virtual image of the user of the second client, wherein the processor is further configured to control the virtual image of the user of the terminal and the action of the virtual image of the user of the second client according to the first operation information, and wherein the transmitter is further configured to send the first operation information to the second client according to the instruction of the processor.

27. The terminal according to claim 16, wherein the receiver is further configured to receive second operation information sent by a fifth client, wherein the second operation information is used for indicating an operation of a user of the fifth client on the virtual image of the user of the terminal, and wherein the processor is further configured to control the virtual image of the user of the terminal and an action of a virtual image of the user of the fifth client according to the second operation information.

* * * * *